US011879367B2

(12) United States Patent
Webb et al.

(10) Patent No.: US 11,879,367 B2
(45) Date of Patent: Jan. 23, 2024

(54) NO$_x$ SENSOR DIAGNOSTICS IN HEAVY-DUTY MOTOR VEHICLE ENGINES

(71) Applicant: PACCAR Inc, Bellevue, WA (US)

(72) Inventors: Cynthia Chaffin Webb, Sedro-Woolley, WA (US); Charles Wayne Reinhardt Swart, Bellingham, WA (US); Maarten Meijer, Anacortes, WA (US); Varun Ramesh, Bellingham, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 17/002,570

(22) Filed: Aug. 25, 2020

(65) Prior Publication Data

US 2022/0025802 A1 Jan. 27, 2022

Related U.S. Application Data

(60) Provisional application No. 63/057,113, filed on Jul. 27, 2020, provisional application No. 63/056,131, (Continued)

(51) Int. Cl.
*F01N 11/00* (2006.01)
*F01N 3/20* (2006.01)
(Continued)

(52) U.S. Cl.
CPC .............. *F01N 3/208* (2013.01); *F01N 11/00* (2013.01); *F02D 41/1441* (2013.01);
(Continued)

(58) Field of Classification Search
CPC ......... F01N 2610/02; F01N 2610/1453; F01N 3/208; F01N 11/00; F01N 2560/026;
(Continued)

(56) References Cited

U.S. PATENT DOCUMENTS

| 5,570,576 A | 11/1996 | Ament et al. |
| 5,588,291 A | 12/1996 | Maus et al. |

(Continued)

FOREIGN PATENT DOCUMENTS

| CN | 106246301 B | 7/2019 |
| DE | 10 2010 034707 A1 | 2/2012 |

(Continued)

*Primary Examiner* — Phutthiwat Wongwian
*Assistant Examiner* — Diem T Tran
(74) *Attorney, Agent, or Firm* — Seed IP Law Group LLP

(57) ABSTRACT

A heavy-duty truck has a diesel engine, an exhaust after-treatment system, and an engine control unit. The exhaust after-treatment system includes a close-coupled selective catalytic reduction system and an underbody selective catalytic reduction system, a first NO$_x$ sensor upstream of the close-coupled selective catalytic reduction system, a second NO$_x$ sensor between the two selective catalytic reduction systems, and a third NO$_x$ sensor downstream of the underbody selective catalytic reduction system. The engine control unit may perform methods allowing intrusive diagnostics to be performed on exhaust gas NO$_x$ sensors using the selective catalytic reduction systems during normal operation of the heavy-duty truck.

15 Claims, 5 Drawing Sheets

Related U.S. Application Data filed on Jul. 24, 2020, provisional application No. 63/054,468, filed on Jul. 21, 2020.

(51) Int. Cl.
  *F02D 41/14* (2006.01)
  *F02D 41/22* (2006.01)

(52) U.S. Cl.
  CPC ....... *F02D 41/1463* (2013.01); *F02D 41/222* (2013.01); *F01N 2390/02* (2013.01); *F01N 2550/05* (2013.01); *F01N 2560/026* (2013.01); *F01N 2560/14* (2013.01); *F01N 2590/08* (2013.01); *F01N 2610/02* (2013.01); *F01N 2610/1453* (2013.01); *F01N 2900/1402* (2013.01)

(58) Field of Classification Search
  CPC ......... F01N 2560/14; F01N 2900/1402; F01N 2390/02; F01N 2550/05; F01N 13/0093; F01N 2590/08; F01N 2900/08; F01N 2900/18; F01N 3/2066; F02D 41/1441; F02D 41/1463

See application file for complete search history.

(56) References Cited

U.S. PATENT DOCUMENTS

| | | |
|---|---|---|
| 5,600,947 A | 2/1997 | Cullen |
| 5,787,705 A | 8/1998 | Thoreson |
| 8,778,290 B1 | 7/2014 | Ren et al. |
| 8,818,691 B2 | 8/2014 | Douglas et al. |
| 10,161,276 B2 | 12/2018 | Miao et al. |
| 10,690,033 B1 | 6/2020 | Johnson et al. |
| 10,753,255 B2 | 8/2020 | Schweizer |
| 10,760,513 B1 | 9/2020 | Huhn et al. |
| 10,808,594 B2 | 10/2020 | Dimoski et al. |
| 10,920,641 B2 | 2/2021 | Kinnaird et al. |
| 11,035,274 B2 | 6/2021 | Johansson et al. |
| 11,181,026 B1 | 11/2021 | Webb et al. |
| 2004/0128983 A1 | 7/2004 | Okada et al. |
| 2006/0153761 A1 | 7/2006 | Bandl-Konrad et al. |
| 2007/0079605 A1 | 4/2007 | Hu et al. |
| 2007/0082783 A1 | 4/2007 | Hu et al. |
| 2007/0122317 A1 | 5/2007 | Driscoll et al. |
| 2007/0193253 A1 | 8/2007 | Tsumagari |
| 2008/0072575 A1 | 3/2008 | Yan |
| 2008/0243358 A1 | 10/2008 | Kojima et al. |
| 2008/0295493 A1 | 12/2008 | Applegate et al. |
| 2009/0035194 A1 | 2/2009 | Robel et al. |
| 2009/0158706 A1 | 6/2009 | Sun |
| 2009/0183501 A1 | 7/2009 | Gonze et al. |
| 2010/0242440 A1 | 9/2010 | Garimella et al. |
| 2011/0000194 A1 | 1/2011 | Gonze et al. |
| 2011/0047964 A1* | 3/2011 | Yezerets ............... F01N 3/2066 60/273 |
| 2011/0061372 A1 | 3/2011 | Levijoki et al. |
| 2011/0265452 A1* | 11/2011 | Geveci ............... F01N 13/0093 60/274 |
| 2011/0271660 A1 | 11/2011 | Gonze et al. |
| 2012/0085082 A1 | 4/2012 | Levijoki et al. |
| 2013/0146024 A1 | 6/2013 | Cunningham et al. |
| 2013/0232958 A1 | 9/2013 | Ancimer et al. |
| 2013/0311065 A1 | 11/2013 | Sun et al. |
| 2014/0033683 A1 | 2/2014 | Wei et al. |
| 2014/0363358 A1 | 12/2014 | Udd et al. |
| 2015/0023853 A1 | 1/2015 | Wittrock et al. |
| 2015/0040540 A1 | 2/2015 | Hulser et al. |
| 2015/0040543 A1 | 2/2015 | Shetney et al. |
| 2015/0096287 A1 | 4/2015 | Qi |
| 2015/0151251 A1 | 6/2015 | Gaudin |
| 2015/0247435 A1 | 9/2015 | Garimella et al. |
| 2015/0275730 A1 | 10/2015 | Gupta et al. |
| 2015/0276694 A1* | 10/2015 | Lahr ................. G01N 33/0037 73/1.06 |
| 2015/0314239 A1 | 11/2015 | Kawaguchi et al. |
| 2015/0337702 A1 | 11/2015 | Ettireddy et al. |
| 2016/0032803 A1 | 2/2016 | Ettireddy et al. |
| 2016/0186629 A1 | 6/2016 | Osburn et al. |
| 2016/0186630 A1* | 6/2016 | Osburn ................. F01N 3/2066 60/274 |
| 2016/0346732 A1 | 12/2016 | Schmitt et al. |
| 2017/0051654 A1 | 2/2017 | Gupta et al. |
| 2017/0114690 A1 | 4/2017 | Gupta et al. |
| 2017/0122159 A1 | 5/2017 | Bahrami |
| 2017/0130629 A1 | 5/2017 | Nagel et al. |
| 2017/0167342 A1 | 6/2017 | Balthes |
| 2017/0175604 A1 | 6/2017 | Devarakonda et al. |
| 2017/0234199 A1 | 8/2017 | Sun et al. |
| 2017/0306819 A1 | 10/2017 | Alfieri et al. |
| 2018/0080359 A1 | 3/2018 | Price et al. |
| 2018/0087426 A1 | 3/2018 | Dou et al. |
| 2018/0163589 A1 | 6/2018 | David et al. |
| 2018/0230879 A1 | 8/2018 | Saitoh et al. |
| 2018/0252136 A1 | 9/2018 | Concetto Pesce et al. |
| 2018/0274420 A1 | 9/2018 | Kleinknecht et al. |
| 2018/0274421 A1 | 9/2018 | Smith et al. |
| 2018/0334939 A1 | 11/2018 | Mital et al. |
| 2018/0345217 A1 | 12/2018 | Goffe |
| 2018/0345218 A1 | 12/2018 | Goffe |
| 2019/0078481 A1 | 3/2019 | Schweizer |
| 2019/0155230 A1 | 5/2019 | Culbertson et al. |
| 2019/0234367 A1 | 8/2019 | Pursifull et al. |
| 2019/0345861 A1 | 11/2019 | Johansson et al. |
| 2019/0360415 A1 | 11/2019 | Romanato |
| 2019/0383189 A1 | 12/2019 | Dou et al. |
| 2020/0063634 A1 | 2/2020 | Smith et al. |
| 2020/0316571 A1 | 10/2020 | Goffe |
| 2020/0332691 A1 | 10/2020 | Soeger et al. |
| 2021/0079826 A1 | 3/2021 | Voss et al. |
| 2021/0095590 A1 | 4/2021 | Bastoreala et al. |
| 2022/0010713 A1 | 1/2022 | McCarthy, Jr. et al. |

FOREIGN PATENT DOCUMENTS

| | | |
|---|---|---|
| DE | 102018101929 A1 | 8/2019 |
| DE | 10 2018 205132 A1 | 10/2019 |
| EP | 3009622 A1 | 4/2016 |
| EP | 3581773 A1 | 12/2019 |
| WO | 2009031030 A2 | 3/2009 |
| WO | 2009123633 A1 | 10/2009 |
| WO | 2014032686 A1 | 3/2014 |

* cited by examiner

$NO_x$ SENSOR DIAGNOSTICS IN HEAVY-DUTY MOTOR VEHICLE ENGINES

BACKGROUND

Technical Field

The present disclosure relates generally to $NO_x$ sensor diagnostics in heavy-duty motor vehicle engines.

Description of the Related Art

Regulated emissions from today's heavy-duty engines demand very low levels of tailpipe emissions, and standards are expected to be further reduced in the near future. To reduce tailpipe exhaust emissions, current technologies rely on aggressive engine control strategies and exhaust after-treatment catalyst systems (catalyst systems used to treat engine exhaust are referred to herein as exhaust after-treatment systems, emissions after-treatment systems, or EAS). The EAS for a typical heavy-duty diesel or other lean-burning engine may include a diesel oxidation catalyst (DOC) to oxidize unburned fuel and carbon monoxide, a diesel particulate filter (DPF) for control of particulate matter (PM), selective catalytic reduction (SCR) systems for reduction of oxides of nitrogen ($NO_x$), and/or an ammonia oxidation catalyst (AMOX). Performance of EAS systems, and of SCR systems in particular, is dependent upon accurate operation of various sensors, including $NO_x$ sensors, as well as other parameters.

SCR processes use catalysts to catalyze the $NO_x$ reduction and a fluid referred to as DEF (diesel emission fluid), which acts as a $NO_x$ reductant over the SCR catalyst. DEF is an aqueous solution that evaporates and decomposes to chemically release ammonia so that the ammonia is available for reaction. Efficiency of SCR operation, in addition to other exhaust gas variables, is also dependent upon DEF dosing levels. Thus, many EAS include $NO_x$ sensors upstream of SCR systems and use the output of such sensors to control DEF dosing to ensure efficient performance of the SCR processes and reduction of $NO_x$ levels to within acceptable ranges, which may be prescribed by various governmental authorities.

BRIEF SUMMARY

A method may be summarized as comprising: operating a diesel engine of a heavy-duty truck such that the diesel engine generates an exhaust gas flow and the exhaust gas flow flows into an exhaust after-treatment system of the heavy-duty truck, the exhaust after-treatment system including a close-coupled selective catalytic reduction system and an underbody selective catalytic reduction system downstream of the close-coupled selective catalytic reduction system with respect to the exhaust gas flow; controlling a DEF injector upstream of the close-coupled selective catalytic reduction system to increase a rate at which the DEF injector injects DEF into the exhaust gas flow; measuring a first level of $NO_x$ gases with a first $NO_x$ sensor upstream of the close-coupled selective catalytic reduction system and a second level of $NO_x$ gases with a second $NO_x$ sensor downstream of the close-coupled selective catalytic reduction system as the rate at which the DEF injector injects DEF increases; and using the measurements to determine a level of error in measurements provided by the first $NO_x$ sensor.

The method may further comprise controlling $NO_x$ tailpipe emissions using the underbody selective catalytic reduction system. The method may further comprise adjusting future measurements provided by the first $NO_x$ sensor based on the determined level of error. Operating the diesel engine may include controlling the diesel engine such that the exhaust gas flow has a constant flow rate, a constant level of $NO_x$ gases, and a constant temperature as it enters the exhaust after-treatment system. Determining the level of error may include: determining measured ammonia-to-$NO_x$ ratios in the close-coupled selective catalytic reduction system as the rate at which the DEF injector injects DEF increases based on the measurements provided by the first $NO_x$ sensor; and determining measured percentage efficiencies of the close-coupled selective catalytic reduction system as the rate at which the DEF injector injects DEF increases based on the measurements provided by the first and second $NO_x$ sensors. Determining the level of error may further include determining a difference between a measured ammonia-to-$NO_x$ ratio at a peak in the measured percentage efficiencies and a known ammonia-to-$NO_x$ ratio at a peak in efficiency of the close-coupled selective catalytic reduction system.

The method may further comprise: while operating the diesel engine, operating the exhaust after-treatment system to eliminate ammonia present in the close-coupled selective catalytic reduction system; after operating the exhaust after-treatment system to eliminate ammonia present in the close-coupled selective catalytic reduction system, controlling the diesel engine such that the exhaust gas flow has a variable level of $NO_x$ gases as it enters the exhaust after-treatment system; measuring $NO_x$ gases with the first $NO_x$ sensor and the second $NO_x$ sensor as the level of $NO_x$ gases in the exhaust gas flow as it enters the exhaust after-treatment system varies; and using the measurements taken as the level of $NO_x$ gases in the exhaust gas flow as it enters the exhaust after-treatment system varies to determine a level of error in measurements provided by the second $NO_x$ sensor.

The method may further comprise adjusting future measurements provided by the second $NO_x$ sensor based on the determined level of error in measurements provided by the second $NO_x$ sensor. Operating the exhaust after-treatment system of the heavy-duty truck to eliminate ammonia present in the close-coupled selective catalytic reduction system may include controlling the DEF injector to stop injecting DEF into the exhaust after-treatment system upstream of the close-coupled selective catalytic reduction system with respect to the exhaust gas flow. Controlling the diesel engine such that the exhaust gas flow has a variable level of $NO_x$ gases as it enters the exhaust after-treatment system may include adjusting an injection timing of the diesel engine. Controlling the diesel engine such that the exhaust gas flow has a variable level of $NO_x$ gases as it enters the exhaust after-treatment system may include adjusting an exhaust gas recirculation through the diesel engine. Determining a level of error in measurements provided by the second $NO_x$ sensor may include performing a linear regression using the measurements taken by the first and second $NO_x$ sensors as the level of $NO_x$ gases in the exhaust gas flow as it enters the exhaust after-treatment system varies.

A method may be summarized as comprising: operating a diesel engine of a heavy-duty truck such that the diesel engine generates an exhaust gas flow and the exhaust gas flow flows into an exhaust after-treatment system including a close-coupled selective catalytic reduction system and an underbody selective catalytic reduction system downstream of the close-coupled selective catalytic reduction system with respect to the exhaust gas flow; controlling a DEF injector downstream of the close-coupled selective catalytic reduction system and upstream of the underbody selective catalytic reduction system to increase a rate at which the DEF injector injects DEF into the exhaust gas flow; measuring a first level of $NO_x$ gases with a first $NO_x$ sensor downstream of the close-coupled selective catalytic reduction system and upstream of the underbody selective catalytic reduction system and a second level of $NO_x$ gases with a second $NO_x$ sensor downstream of the underbody selective catalytic reduction system as the rate at which the DEF injector injects DEF increases; and using the measurements to determine a level of error in measurements provided by the first $NO_x$ sensor.

The method may further comprise controlling $NO_x$ tailpipe emissions using the close-coupled selective catalytic reduction system. Determining the level of error may include: determining measured ammonia-to-$NO_x$ ratios in the underbody selective catalytic reduction system as the rate at which the DEF injector injects DEF increases based on the measurements provided by the first $NO_x$ sensor; and determining measured percentage efficiencies of the underbody selective catalytic reduction system as the rate at which the DEF injector injects DEF increases based on the measurements provided by the first and second $NO_x$ sensors. Determining the level of error may further include determining a difference between a measured ammonia-to-$NO_x$ ratio at a peak in the measured percentage efficiencies and a known ammonia-to-$NO_x$ ratio at a peak in efficiency of the underbody selective catalytic reduction system.

The method may further comprise: while operating the diesel engine, operating the exhaust after-treatment system to eliminate ammonia present in the underbody selective catalytic reduction system; after operating the exhaust after-treatment system to eliminate ammonia present in the underbody selective catalytic reduction system, controlling the diesel engine and the close-coupled selective catalytic reduction system such that the exhaust gas flow has a variable level of $NO_x$ gases as it enters the underbody selective catalytic reduction system; measuring $NO_x$ gases with the first $NO_x$ sensor and the second $NO_x$ sensor as the level of $NO_x$ gases in the exhaust gas flow as it enters the underbody selective catalytic reduction system varies; and using the measurements taken as the level of $NO_x$ gases in the exhaust gas flow as it enters the underbody selective catalytic reductions system varies to determine a level of error in measurements provided by the second $NO_x$ sensor. Determining a level of error in measurements provided by the second $NO_x$ sensor may include performing a linear regression using the measurements taken by the first and second $NO_x$ sensors as the level of $NO_x$ gases in the exhaust gas flow as it enters the underbody selective catalytic reduction system varies.

A heavy-duty truck may be summarized as comprising: a diesel engine; an exhaust after-treatment system having an upstream end and a downstream end opposite the upstream end, the upstream end coupled to the diesel engine, the exhaust after-treatment system including: a first $NO_x$ sensor; a close-coupled selective catalytic reduction system downstream of the first $NO_x$ sensor; a second $NO_x$ sensor downstream of the close-coupled selective catalytic reduction system; an underbody selective catalytic reduction system downstream of the second $NO_x$ sensor; and a third $NO_x$ sensor downstream of the underbody selective catalytic reduction system.

The heavy-duty truck may further comprise an engine control unit configured to: operate the diesel engine such that the diesel engine generates an exhaust gas flow; control the diesel engine such that the exhaust gas flow has a constant level of $NO_x$ gases as it enters the exhaust after-treatment system; control a DEF injector upstream of the close-coupled selective catalytic reduction system to increase a rate at which the DEF injector injects DEF into the exhaust gas flow; measure a first level of $NO_x$ gases with the first $NO_x$ sensor and a second level of $NO_x$ gases with the second $NO_x$ sensor as the rate at which the DEF injector injects DEF increases; and use the measurements to determine a level of error in measurements provided by the first $NO_x$ sensor.

DETAILED DESCRIPTION

Figure 1:
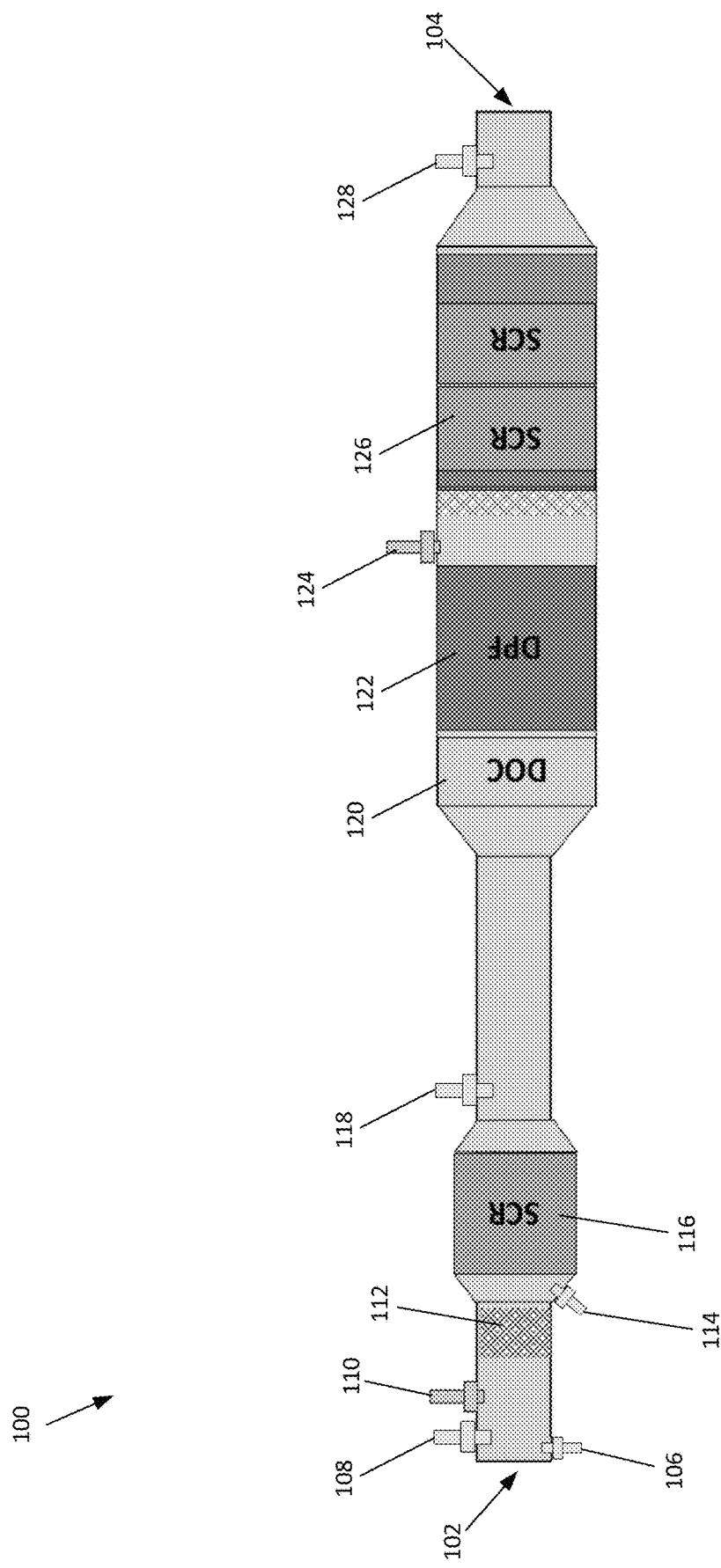
FIG. 1 illustrates a diagram of an exhaust after-treatment system including a DOC, a DPF, and dual SCR systems.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The use of ordinals such as first, second and third does not necessarily imply a ranked sense of order, but rather may only distinguish between multiple instances of an act or structure.

Terms of geometric alignment may be used herein. Any components of the embodiments that are illustrated, described, or claimed herein as being aligned, arranged in the same direction, parallel, or having other similar geometric relationships with respect to one another have such relationships in the illustrated, described, or claimed embodiments. In alternative embodiments, however, such components can have any of the other similar geometric properties described herein indicating alignment with respect to one another. Any components of the embodiments that are illustrated, described, or claimed herein as being not aligned, arranged in different directions, not parallel, perpendicular, transverse, or having other similar geometric relationships with respect to one another, have such relationships in the illustrated, described, or claimed embodiments. In alternative embodiments, however, such components can have any of the other similar geometric properties described herein indicating non-alignment with respect to one another.

Various examples of suitable dimensions of components and other numerical values may be provided herein. In the illustrated, described, and claimed embodiments, such dimensions are accurate to within standard manufacturing tolerances unless stated otherwise. Such dimensions are examples, however, and can be modified to produce variations of the components and systems described herein. In various alternative embodiments, such dimensions and any other specific numerical values provided herein can be approximations wherein the actual numerical values can vary by up to 1, 2, 5, 10, 15 or more percent from the stated, approximate dimensions or other numerical values.

Traditionally, heavy-duty vehicles included many components of exhaust after-treatment systems "underbody," that is, underneath the engine, cab, or another portion of the vehicle, where space is relatively freely available and these components can therefore generally be larger than would otherwise be practical. Some modern heavy-duty vehicles, however, have begun to include a "close-coupled," "up-close," or "light-off" SCR unit much closer to the engine and exhaust ports thereof (e.g., adjacent to a turbine outlet of a turbocharger) and upstream of the traditional underbody exhaust after-treatment system, which can provide certain advantages in that the temperature of the engine exhaust may be higher when it is closer to the engine, although locating an SCR unit nearer the engine limits the available space and thus its practical size. Thus, some modern heavy-duty vehicles have included both a "close-coupled" SCR unit upstream with respect to the flow of the exhaust, such as adjacent to a turbine outlet of a turbocharger, to take advantage of the higher exhaust temperatures, as well as an "underbody" SCR unit downstream with respect to the flow of the exhaust, such as under the engine or cab of the vehicle, to take advantage of the greater available space.

FIG. 1 illustrates a diagram of an exhaust after-treatment system 100 that has a first, upstream end 102 and a second, downstream end 104 opposite to the first, upstream end 102. The exhaust after-treatment system 100 is a component of a vehicle, such as a large, heavy-duty, diesel truck, and in use carries exhaust from the diesel engine of the truck to a tailpipe of the truck. For example, the first, upstream end 102 of the exhaust after-treatment system 100 may be coupled directly to an exhaust port or an outlet port of the diesel engine, such as a turbine outlet of a turbocharger thereof, and the second, downstream end 104 may be coupled directly to an inlet port of a tailpipe or muffler of the truck. Thus, when the engine is running and generating exhaust, the exhaust travels along the length of the exhaust after-treatment system 100 from the first, upstream end 102 thereof to the second, downstream end 104 thereof.

As illustrated in FIG. 1, the exhaust after-treatment system 100 includes, at its first, upstream end 102, or proximate or adjacent thereto, a first temperature sensor 106, which may be a thermocouple, to measure the temperature of the exhaust gas flow as it leaves the engine and enters the exhaust after-treatment system 100, before heat begins to be lost through the exhaust after-treatment system 100 to the environment. The exhaust after-treatment system 100 also includes, at its first, upstream end 102, or proximate or adjacent thereto, or just downstream of the first temperature sensor 106, a first $NO_x$ sensor 108, to measure the content of $NO_x$ gases in the exhaust gas flow as it leaves the engine and enters the exhaust after-treatment system 100. The exhaust after-treatment system 100 also includes, at its first, upstream end 102, or proximate or adjacent thereto, or just downstream of the first $NO_x$ sensor 108, a first DEF injector 110, to inject DEF into the exhaust gas flow as it leaves the engine and enters the exhaust after-treatment system 100.

The exhaust after-treatment system 100 also includes, proximate or adjacent its first, upstream end 102, or just downstream of the first DEF injector 110, a heater 112, which may be an electrically-powered resistive heater or heating element, a burner, or any other suitable heater, to inject heat energy into the exhaust gas flow and the injected DEF as they flow through the exhaust after-treatment system 100. The exhaust after-treatment system 100 also includes, just downstream of the heater 112, a second temperature sensor 114, which may be a thermocouple, to measure the temperature of the exhaust gas flow as it leaves the heater 112 and just before or just as it enters a first, close-coupled SCR system 116, or at the inlet to the close-coupled SCR system 116. The exhaust after-treatment system 100 also includes, just downstream of the heater 112 and the second temperature sensor 114, the first, close-coupled SCR system 116, which is configured to reduce oxides of nitrogen ($NO_x$) in the exhaust gas flow.

The exhaust after-treatment system 100 also includes, just downstream of the first SCR system 116, a second $NO_x$ sensor 118, to measure the content of $NO_x$ gases in the exhaust gas flow as it leaves the first SCR system 116. In practice, the first $NO_x$ sensor 108 and the second $NO_x$ sensor 118 can be used together to monitor, assess, or measure the performance of the first SCR system 116. Together, the first temperature sensor 106, the first $NO_x$ sensor 108, the first DEF injector 110, the heater 112, the second temperature sensor 114, the first, close-coupled SCR system 116, and the second $NO_x$ sensor 118 can be referred to as a close-coupled portion of the exhaust after-treatment system 100, as they can be collectively located at or adjacent to the engine of the vehicle.

The exhaust after-treatment system 100 also includes, downstream of the first SCR system 116 and the second $NO_x$ sensor 118, a DOC component 120, to oxidize unburned fuel and carbon monoxide in the exhaust gas flow. The exhaust after-treatment system 100 also includes, downstream of the DOC component 120, a DPF 122, to reduce or otherwise control particulate matter in the exhaust gas flow. The exhaust after-treatment system 100 also includes, downstream of the DPF 122, a second DEF injector 124, to inject DEF into the exhaust gas flow as it leaves the DPF 122. The exhaust after-treatment system 100 also includes, downstream of the second DEF injector 124, a second, underbody SCR system 126, which is configured to reduce oxides of nitrogen ($NO_x$) in the exhaust gas flow. The exhaust after-treatment system 100 also includes, just downstream of the second SCR system 126 and at its second, downstream end 104, or proximate or adjacent thereto, a third $NO_x$ sensor 128, to measure the content of $NO_x$ gases in the exhaust gas flow as it leaves the second SCR system 126.

In practice, the second $NO_x$ sensor 118 and the third $NO_x$ sensor 128 can be used together to monitor, assess, or measure the performance of the second SCR system 126. Together, the DOC component 120, the DPF 122, the second DEF injector 124, the second SCR system 126, and the third $NO_x$ sensor 128 can be referred to as an underbody portion of the exhaust after-treatment system 100, as they can be collectively located underneath the engine, cab, or another portion of the vehicle.

As noted previously, performance of exhaust after-treatment systems, and of SCR systems in particular, is dependent upon accurate operation of various sensors, including $NO_x$ sensors, as well as other parameters. More specifically, DEF dosing levels and injection by the injectors 110 and 124 into exhaust after-treatment systems is often determined or controlled based on measurements of $NO_x$ levels provided by the $NO_x$ sensors 108, 118, and/or 128. Thus, accurate operation of the $NO_x$ sensors 108, 118, and/or 128 can be critical to maintaining compliance with emissions regulations. Nevertheless, injection of excess DEF is wasteful and costly, and therefore represents a reduction of overall system efficiency, and can result in ammonia slip (a condition where ammonia not utilized in the $NO_x$ reduction reaction is emitted from the catalyst), which is also limited by emissions mandates. Thus, it is critical to ensure accurate and precise performance of the sensors 108, 118, and/or 128, to ensure compliance with emissions standards without unduly reducing overall system efficiency.

It has been found that the performance of $NO_x$ sensors used in exhaust after-treatment systems varies from sensor to sensor, such as a result of production variation, and degrades or drifts over time, due to a variety of factors such as aging, abuse through over-heating, and/or failure of other components. Thus, in order to ensure that such sensors are performing adequately, that is, providing accurate and precise measurements of actual $NO_x$ levels in the exhaust gas flow, the importance of monitoring sensor performance has been recognized. Nevertheless, it can be difficult to perform accurate diagnostics on SCR systems or $NO_x$ sensors associated therewith during normal operation of the motor vehicle of which they are a part without affecting the performance of the SCR systems or $NO_x$ sensors under test (sometimes referred to as "intrusive diagnostics"). Intrusive diagnostics can change, and in some cases increase, tailpipe emissions, which is prohibited by certain regulatory bodies. To monitor the performance of $NO_x$ sensors in exhaust after-treatment systems, such as the sensors 108, 118, and 128 in the exhaust after-treatment system 100, it has therefore been found to be advantageous to monitor performance of the sensors in accordance with the techniques described herein.

In a first embodiment, the second SCR system 126 is used to control $NO_x$ tailpipe emissions from the vehicle, with DEF dosing provided by the second DEF injector 124 controlled by a measurement of $NO_x$ levels in the exhaust gas flow provided by either the first $NO_x$ sensor 108 or the second $NO_x$ sensor 118 upstream of the second DEF injector 124 and the second SCR system 126. While the second SCR system 126 is being used to control $NO_x$ tailpipe emissions to within acceptable ranges, performance of the first SCR system 116 can be modified as needed in order to perform diagnostics on the first $NO_x$ sensor 108 and/or the second $NO_x$ sensor 118.

In a first portion of the diagnostic testing, an engine control unit (ECU) of the vehicle controls the first DEF injector 110 to stop injecting DEF into the exhaust after-treatment system and the exhaust gas flow therein. The engine control unit may then allow the first SCR system 116 to stabilize over a period of time, until any residual ammonia present in the first SCR system 116 has reacted with $NO_x$ gases therein or otherwise been consumed or left the first SCR system 116. Once sufficient time has passed and no residual ammonia remains present in the first SCR system 116, or an amount of ammonia present in the first SCR system 116 is less than a threshold amount, the engine control unit of the vehicle can adjust operating parameters of the diesel engine to change actual levels of $NO_x$ gases in the exhaust gas flow travelling through the exhaust after-treatment system 100. Such operating parameters may include injection timing of the diesel engine, rate of fuel injection into the diesel engine, and/or exhaust gas recirculation through the diesel engine.

Figure 2:
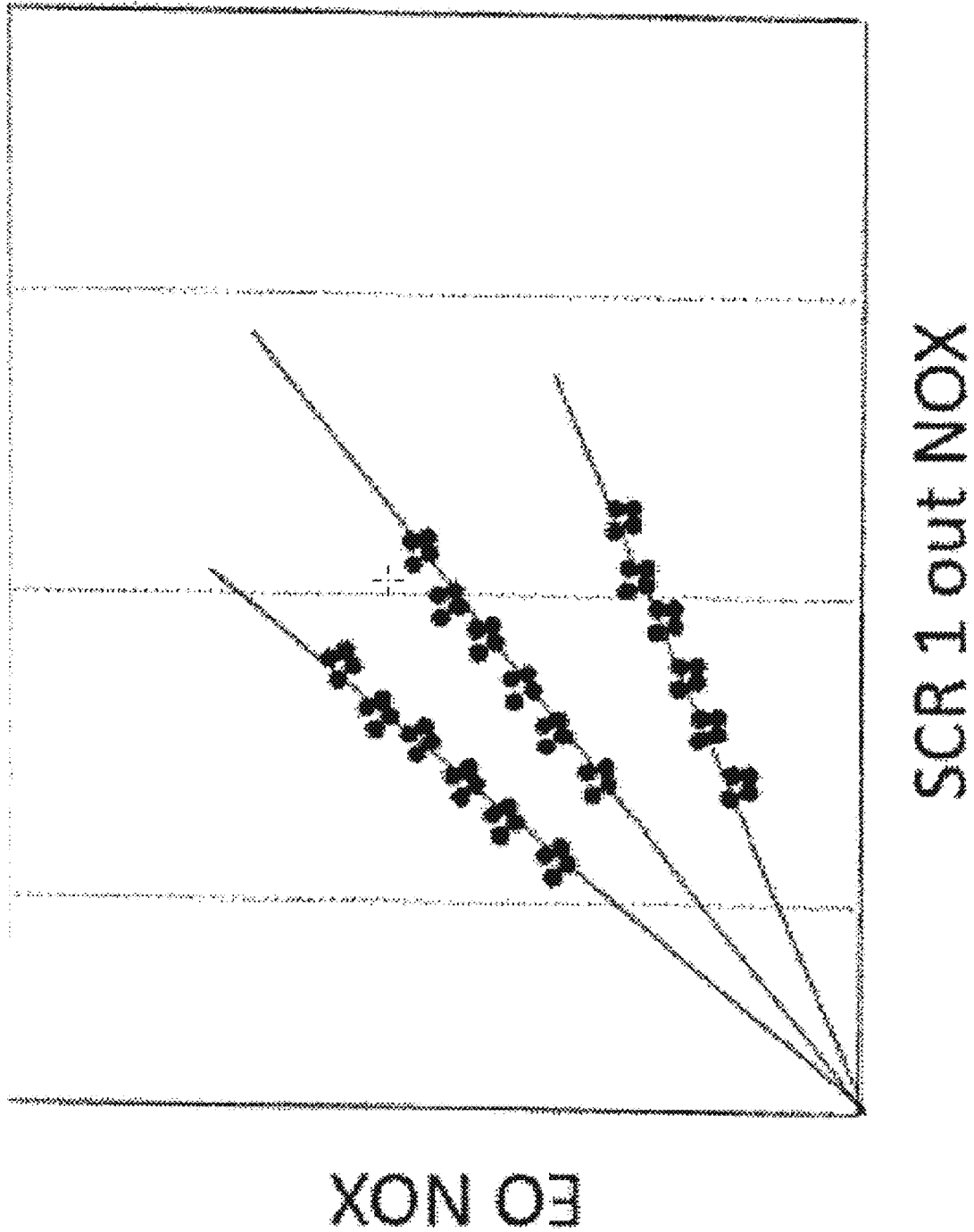
FIG. 2 illustrates performance differences between two $NO_x$ sensors in the exhaust after-treatment system of FIG. 1.
Figure 3:
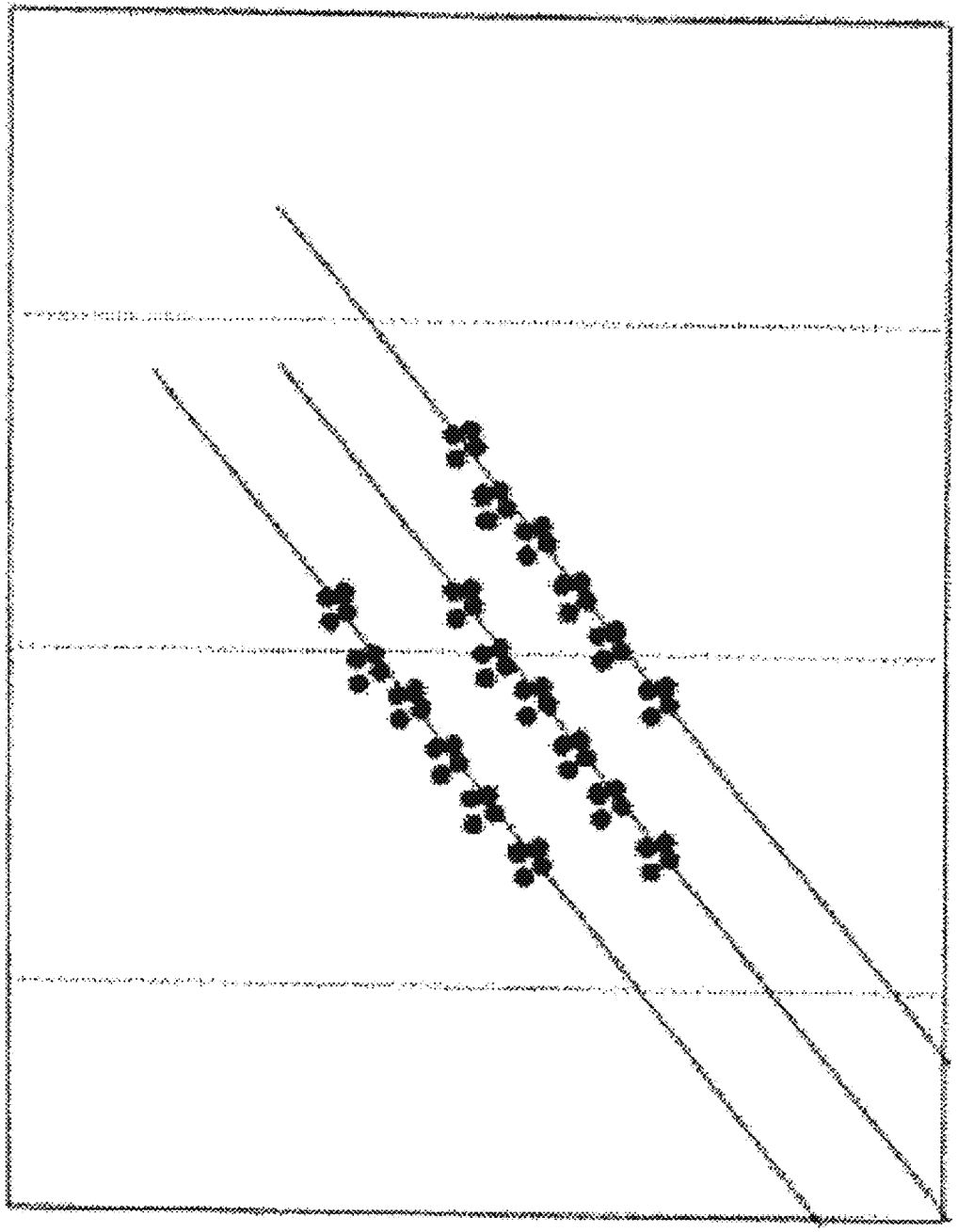
FIG. 3 illustrates additional performance differences between two $NO_x$ sensors in the exhaust after-treatment system of FIG. 1.

Measurements of the levels of the $NO_x$ gases in the exhaust gas flow travelling through the exhaust after-treatment system 100 are provided by the first $NO_x$ sensor 108 and the second $NO_x$ sensor 118 and recorded, such as in a database, by the engine control unit. A linear regression is then performed between the set of measurements provided by the first $NO_x$ sensor 108 and the second $NO_x$ sensor 118. Such linear regression provides a calculated slope and a calculated position of a best fit line between the two sets of data, which may be referred to as a gain and an offset, respectively, between the measurements provided by the $NO_x$ sensors 108 and 118. For example, FIG. 2 illustrates three examples of best fit lines calculated based on data provided by the first $NO_x$ sensor 108 (illustrated along the Y-axis) and the second $NO_x$ sensor 118 (illustrated along the X-axis), with the same units along the respective axes. In particular, FIG. 2 illustrates that the measurements provided by the two sensors may have a slope or a gain with respect to one another of greater than 1, equal to 1, or less than 1. As another example, FIG. 3 illustrates three examples of best fit lines calculated based on data provided by the first $NO_x$ sensor 108 (illustrated along the Y-axis) and the second $NO_x$ sensor 118 (illustrated along the X-axis), with the same units along the respective axes. In particular, FIG. 3 illustrates that the measurements provided by the two sensors may have an offset with respect to one another of greater than 0, equal to 0, or less than 0.

In a second portion of the diagnostic testing, the engine control unit of the vehicle controls operation of the vehicle and its diesel engine to ensure that the exhaust gas flow has a constant or substantially constant flow rate, temperature, and levels of $NO_x$ gases. The engine control unit and/or EAS then controls the first DEF injector 110 to slowly and gradually increase the rate at which DEF is injected into the exhaust after-treatment system and the exhaust gas flow therein. Such increase may be linear with time or follow any other established pattern. As the rate at which DEF is injected increases, measurements of the levels of the $NO_x$ gases in the exhaust gas flow travelling through the exhaust after-treatment system 100 are provided by the first $NO_x$ sensor 108 and the second $NO_x$ sensor 118 and recorded, such as in a database, by the engine control unit.

Measured ammonia-to-$NO_x$ levels or ratios (ANR) present in the first SCR system 116 over the course of the testing are determined based on the rate of injection of DEF and the measurements taken by the first $NO_x$ sensor 108, such as by calculating ratios of the rate of DEF injection to the measurements taken by the first $NO_x$ sensor 108 at various times over the course of the testing. Measured reductions in $NO_x$ levels produced by the first SCR system 116 over the course of the testing are also determined by calculating the difference between the measurements taken by the first $NO_x$ sensor 108 and the second $NO_x$ sensor 118, or by calculating a percentage of the $NO_x$ levels measured by the first $NO_x$ sensor represented by the $NO_x$ levels measured by the second $NO_x$ sensor, at various times over the course of the testing. The measured ammonia-to-$NO_x$ levels and the measured reductions (such as in units of percentage efficiency of the first SCR system 116) may be recorded, such as in the database by the engine control unit and/or EAS.

Figure 4:
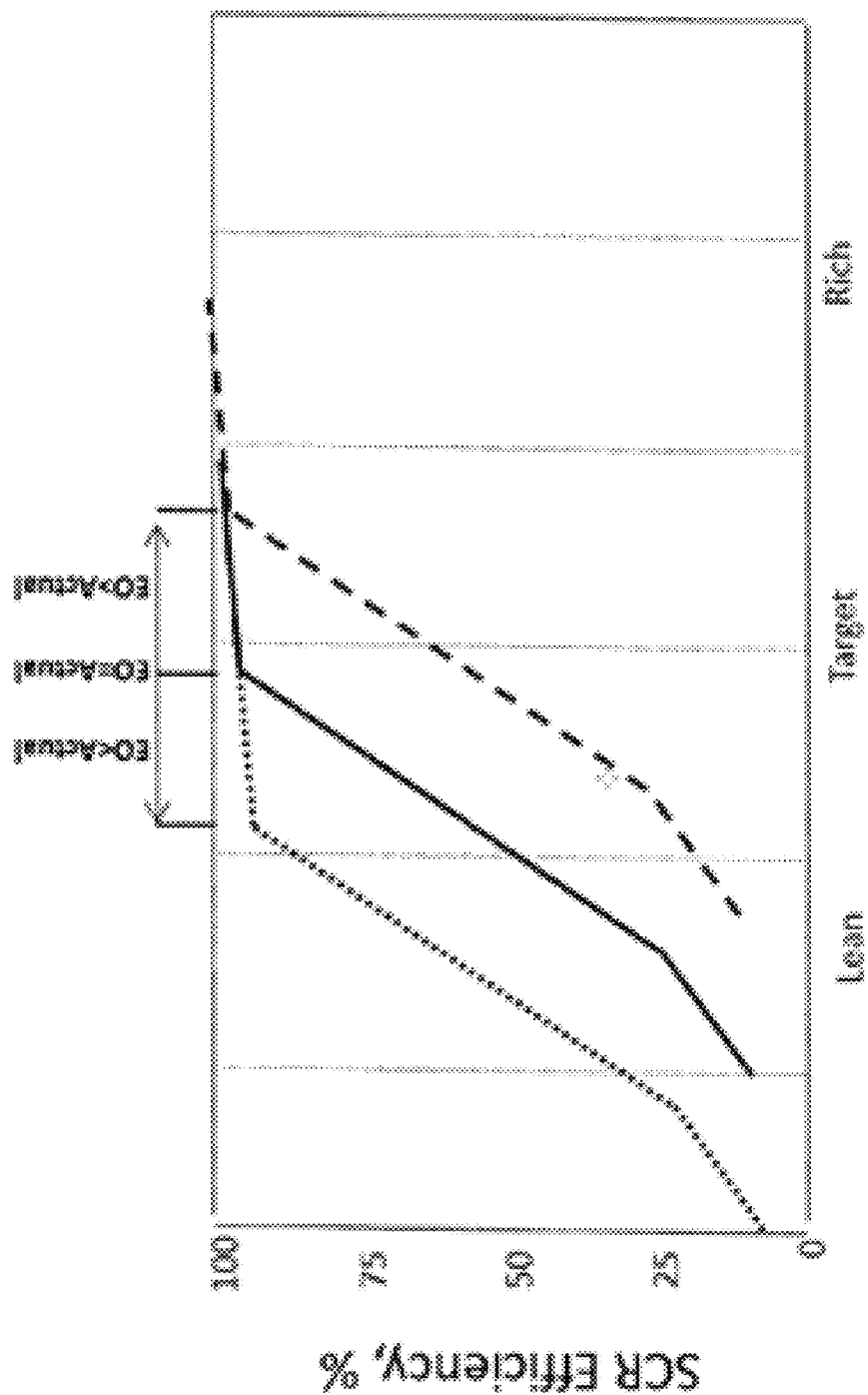
FIG. 4 illustrates performance of a $NO_x$ sensor in the exhaust after-treatment system of FIG. 1.

Efficiencies of SCR system performances have well-established relationships with ammonia-to-$NO_x$ levels present in the SCR systems during operation. Generally, efficiency increases with increased ammonia-to-$NO_x$ levels, but increases in efficiency generally taper off as they reach 100%, may reach a peak, and do not exceed 100%. As illustrated in FIG. 4, when such efficiencies are plotted against ANR, the resulting curves typically have three well-established phases or portions: a first portion at lower levels of ANR and resulting efficiency, a second portion at intermediate levels of ANR and resulting efficiency, and a third portion at higher levels of ANR and resulting efficiency, which may include a peak in efficiency, with well-defined and visible transitions or corners between the first and second portions and between the second and third portions. In particular, the first portion of the curve typically has a first slope, the second portion of the curve typically has a second slope, and the third portion of the curve typically has a third slope, where the slope of the second portion of the curve is greater or steeper than the slope of the first portion of the curve and the slope of the first portion of the curve is greater or steeper than the slope of the third portion of the curve, and the third portion of the curve may include a peak of the efficiency of the first SCR system 116.

Because the shapes of these curves are consistent and have been well-established, they can be used to determine the accuracy of the first $NO_x$ sensor 108. For example, the engine control unit can determine a difference between a measured ammonia-to-$NO_x$ ratio at a peak of the SCR system efficiency, or at the transition between the second and third portions of the curves described herein, and a known ammonia-to-$NO_x$ ratio at a peak of the SCR system efficiency, or at the transition between the second and third portions of the curves described herein, respectively, such as by subtracting the measured ratio from the known ratio. FIG. 4 illustrates that such a calculation may reveal that the measurements of $NO_x$ levels provided by the first $NO_x$ sensor 108 are less than actual $NO_x$ levels, equal to actual $NO_x$ levels, or greater than actual $NO_x$ levels.

Once such a difference is calculated, it can be used to adjust or correct future measurements provided by the first $NO_x$ sensor 108, thereby compensating for errors in such measurements. For example, a subsequent measurement provided by the first $NO_x$ sensor 108 can be adjusted by dividing the uncorrected, unadjusted measured $NO_x$ levels by one minus the calculated difference to get the corrected or adjusted measured $NO_x$ levels at the location of the first $NO_x$ sensor 108. Once the error in the first $NO_x$ sensor 108 has been determined and corrected in this manner, such determination can be used in combination with the linear regression performed in the first portion of the diagnostic testing to similarly determine and correct errors in the measurements provided by the second $NO_x$ sensor 118. In some embodiments, future operation of the vehicle, its engine, and the exhaust after-treatment system 100, including any of the components and parameters described herein, such as the rate at which the first DEF injector 110 injects DEF or parameters of operation of the heater 112, may be operated or selected based on such corrected or adjusted measured $NO_x$ levels at the locations of the first and second $NO_x$ sensors 108 and 118, rather than on the uncorrected, unadjusted measured $NO_x$ levels.

The techniques described herein may be referred to as "intrusive diagnostics" because they require variation in the performance of $NO_x$ emissions-controlling components during normal operation of the motor vehicle of which they are a part and a diesel engine thereof. In some embodiments, the first portion of the diagnostic testing may be performed before the second portion of the diagnostic testing, while in other embodiments, the second portion of the diagnostic testing may be performed before the first portion of the diagnostic testing.

In a second embodiment, the first SCR system 116 is used to control $NO_x$ tailpipe emissions from the vehicle, with DEF dosing provided by the first DEF injector 110 controlled by a measurement of $NO_x$ levels in the exhaust gas flow provided by the first $NO_x$ sensor 108 upstream of the first DEF injector 110 and the first SCR system 116. While the first SCR system 116 is being used to control $NO_x$ tailpipe emissions to within acceptable ranges, performance of the second SCR system 126 can be modified as needed in order to perform diagnostics on the second $NO_x$ sensor 118 and/or the third $NO_x$ sensor 128. In some implementations, the operation of the second SCR system 126 in such an embodiment may only improve (that is, decrease) $NO_x$ emissions levels within the exhaust after-treatment system 100, such that these intrusive diagnostics may be allowed to be performed without additional exhaust treatment downstream. In some implementations, the operation of the first SCR system 116 may be configured to reduce $NO_x$ emissions levels to below regulated levels (e.g., such as by 1%, 2%, 5%, 10%, or more) such that slight increases in emissions levels resulting from operation of the second SCR system 126 do not increase tailpipe emissions to above regulated levels, such that these intrusive diagnostics may be performed without crossing regulated emission level thresholds.

In a first portion of the diagnostic testing, an engine control unit (ECU) of the vehicle controls the second DEF injector 124 to stop injecting DEF into the exhaust after-treatment system and the exhaust gas flow therein. The engine control unit may then allow the second SCR system 126 to stabilize over a period of time, until any residual ammonia present in the second SCR system 126 has reacted with $NO_x$ gases therein or otherwise been consumed or left the second SCR system 126. Once sufficient time has passed and no residual ammonia remains present in the second SCR system 126, or an amount of ammonia present in the second SCR system 126 is less than a threshold amount, the engine control unit of the vehicle can adjust operating parameters of the diesel engine and/or the first SCR system 116 to change actual levels of $NO_x$ gases in the exhaust gas flow travelling through the exhaust after-treatment system 100. Such operating parameters may include injection timing of the diesel engine, rate of fuel injection into the diesel engine, and/or exhaust gas recirculation through the diesel engine, as well as a rate of DEF injection provided by the first DEF injector 110.

Measurements of the levels of the $NO_x$ gases in the exhaust gas flow travelling through the exhaust after-treatment system 100 are provided by the second $NO_x$ sensor 118 and the third $NO_x$ sensor 128 and recorded, such as in a database, by the engine control unit. A linear regression is then performed between the set of measurements provided by the second $NO_x$ sensor 118 and the third $NO_x$ sensor 128. Such linear regression provides a calculated slope and a calculated position of a best fit line between the two sets of data, which may be referred to as a gain and an offset, respectively, between the measurements provided by the $NO_x$ sensors 118 and 128. For example, FIG. 2 illustrates three examples of best fit lines calculated based on data provided by the second $NO_x$ sensor 118 (illustrated along the Y-axis) and the third $NO_x$ sensor 128 (illustrated along the X-axis), with the same units along the respective axes. In particular, FIG. 2 illustrates that the measurements provided by the two sensors may have a slope or a gain with respect to one another of greater than 1, equal to 1, or less than 1. As another example, FIG. 3 illustrates three examples of best fit lines calculated based on data provided by the second $NO_x$ sensor 118 (illustrated along the Y-axis) and the third $NO_x$ sensor 128 (illustrated along the X-axis), with the same units along the respective axes. In particular, FIG. 3 illustrates that the measurements provided by the two sensors may have an offset with respect to one another of greater than 0, equal to 0, or less than 0.

In a second portion of the diagnostic testing, the engine control unit of the vehicle controls operation of the vehicle, its diesel engine, and the first SCR system 116 to ensure that the exhaust gas flow has constant or substantially constant flow rate, temperature, and levels of $NO_x$ gases. The engine control unit and/or EAS then controls the second DEF injector 124 to slowly and gradually increase the rate at which DEF is injected into the exhaust after-treatment system and the exhaust gas flow therein. Such increase may be linear with time or follow any other established pattern. As the rate at which DEF is injected increases, measurements of the levels of the $NO_x$ gases in the exhaust gas flow travelling through the exhaust after-treatment system 100 are provided by the second $NO_x$ sensor 118 and the third $NO_x$ sensor 128 and recorded, such as in a database, by the engine control unit.

Measured ammonia-to-$NO_x$ levels or ratios (ANR) present in the second SCR system 126 over the course of the testing are determined based on the rate of injection of DEF and the measurements taken by the second $NO_x$ sensor 118, such as by calculating ratios of the rate of DEF injection to the measurements taken by the second $NO_x$ sensor 118 at various times over the course of the testing. Measured reductions in $NO_x$ levels produced by the second SCR system 126 over the course of the testing are also determined by calculating the difference between the measurements taken by the second $NO_x$ sensor 118 and the third $NO_x$ sensor 128, or by calculating a percentage of the $NO_x$ levels measured by the second $NO_x$ sensor 118 represented by the $NO_x$ levels measured by the third $NO_x$ sensor, 128 at various times over the course of the testing. The measured ammonia-to-$NO_x$ levels and the measured reductions (such as in units of percentage efficiency of the second SCR system 126) may be recorded, such as in the database by the engine control unit and/or EAS.

The engine control unit can then determine a difference between a measured ammonia-to-$NO_x$ ratio at a peak of the efficiency of the second SCR system 126, or at the transition between the second and third portions of the curves described herein, and a known ammonia-to-$NO_x$ ratio at a peak of the efficiency of the second SCR system 126, or at the transition between the second and third portions of the curves described herein, respectively, such as by subtracting the measured ratio from the known ratio. FIG. 4 illustrates that such a calculation may reveal that the measurements of $NO_x$ levels provided by the second $NO_x$ sensor 118 are less than actual $NO_x$ levels, equal to actual $NO_x$ levels, or greater than actual $NO_x$ levels.

Once such a difference is calculated, it can be used to adjust or correct future measurements provided by the second $NO_x$ sensor 118, thereby compensating for errors in such measurements. For example, a subsequent measurement provided by the second $NO_x$ sensor 118 can be adjusted by dividing the uncorrected, unadjusted measured $NO_x$ levels by one minus the calculated difference to get the corrected or adjusted measured $NO_x$ levels at the location of the second $NO_x$ sensor 118. Once the error in the second $NO_x$ sensor 118 has been determined and corrected in this manner, such determination can be used in combination with the linear regression performed in the first portion of the diagnostic testing to similarly determine and correct errors in the measurements provided by the third $NO_x$ sensor 128. In some embodiments, future operation of the vehicle, its engine, and the exhaust after-treatment system 100, including any of the components and parameters described herein, such as the rate at which the second DEF injector 124 injects DEF or parameters of operation of a heater, may be operated or selected based on such corrected or adjusted measured $NO_x$ levels at the locations of the second and third $NO_x$ sensors 118 and 128, rather than on the uncorrected, unadjusted measured $NO_x$ levels.

The techniques described herein may be referred to as "intrusive diagnostics" because they require variation in the performance of $NO_x$ emissions-controlling components during normal operation of the motor vehicle of which they are a part and a diesel engine thereof. In some embodiments, the first portion of the diagnostic testing may be performed before the second portion of the diagnostic testing, while in other embodiments, the second portion of the diagnostic testing may be performed before the first portion of the diagnostic testing.

Figure 5:
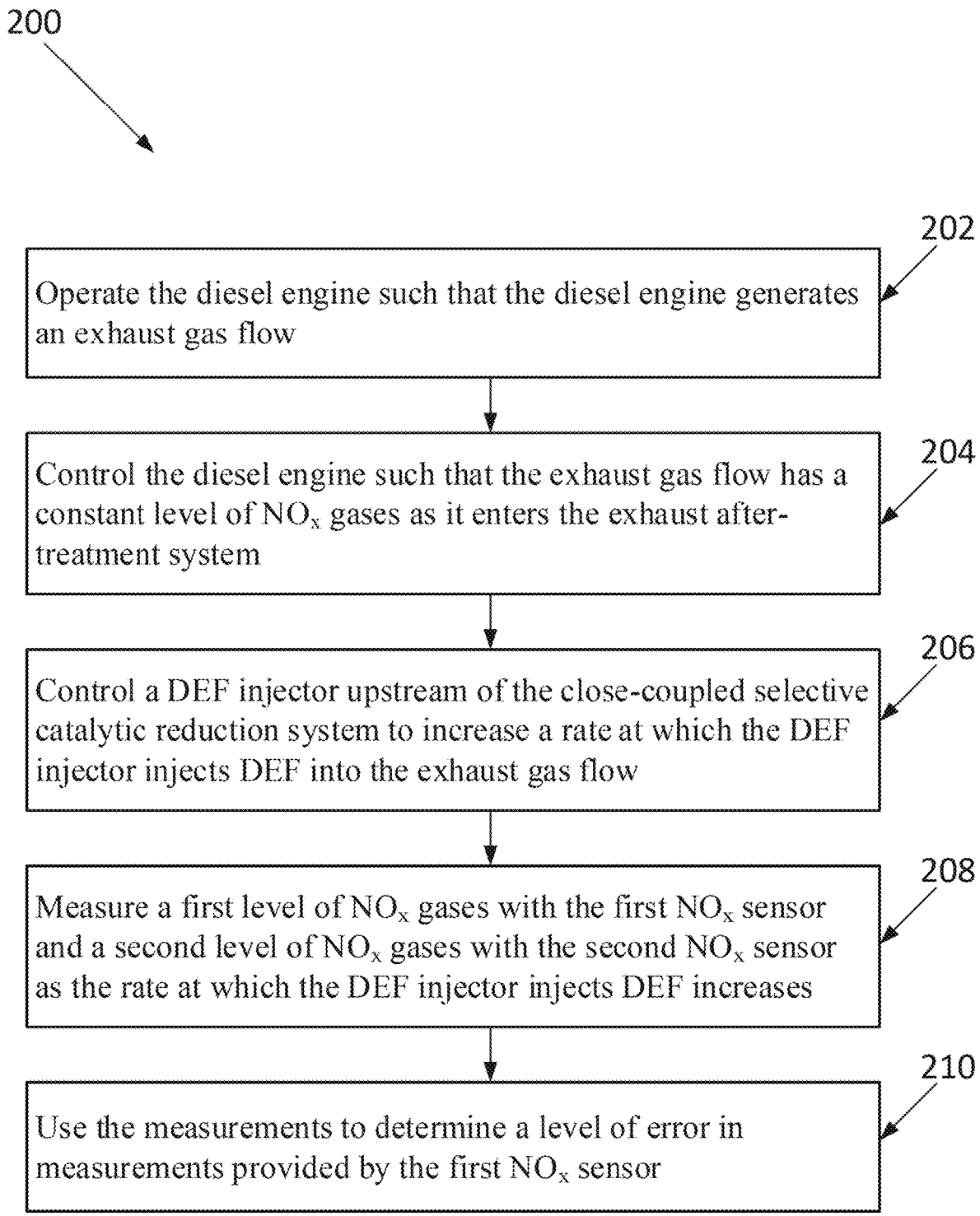
FIG. 5 illustrates a flow chart of a method of using the systems described herein.

FIG. 5 illustrates a flow chart 200 of a summarized version of a method in accordance with the present disclosure. As illustrated in FIG. 5, the method includes, at 202, operating a diesel engine such that the diesel engine generates an exhaust gas flow. The method further includes, at 204, controlling the diesel engine such that the exhaust gas flow has a constant level of $NO_x$ gases as it enters an exhaust after-treatment system, and at 206, controlling a DEF injector upstream of a close-coupled selective catalytic reduction system to increase a rate at which the DEF injector injects DEF into the exhaust gas flow. The method further includes, at 208, measuring a first level of $NO_x$ gases with a first $NO_x$ sensor and a second level of $NO_x$ gases with a second $NO_x$ sensor as the rate at which the DEF injector injects DEF increases, and at 210, using the measurements to determine a level of error in measurements provided by the first $NO_x$ sensor.

The techniques described herein may include controlling operation of the vehicle and its diesel engine to ensure that the exhaust gas flow has a constant or substantially constant flow rate, temperature, and levels of $NO_x$ gases. In some alternative embodiments, however, the techniques described herein may be carried out under transient $NO_x$, temperature, and/or exhaust flow rate conditions. In other embodiments, the exhaust after-treatment system 100 may include three, four, or any other number of independent SCR systems, together with respective heaters, temperature sensors, and $NO_x$ sensors. Each of the SCR systems and respective $NO_x$ sensors can have features corresponding to those described herein for the close-coupled SCR system 116, the underbody SCR system 126, and/or the $NO_x$ sensors 108, 118, and/or 128.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
operating a diesel engine of a heavy-duty truck such that the diesel engine generates an exhaust gas flow and the exhaust gas flow flows into an exhaust after-treatment system of the heavy-duty truck, the exhaust after-treatment system including a close-coupled selective catalytic reduction system and an underbody selective catalytic reduction system downstream of the close-coupled selective catalytic reduction system with respect to the exhaust gas flow;
controlling a first DEF injector upstream of the close-coupled selective catalytic reduction system to increase a first rate at which the DEF injector injects DEF into the exhaust gas flow;
measuring a first level of NOx gases with a first NOx sensor upstream of the close-coupled selective catalytic reduction system and a second level of NOx gases with a second NOx sensor downstream of the close-coupled selective catalytic reduction system as the first rate at which the first DEF injector injects DEF increases;
using the measurements to determine a level of error in measurements provided by the first NOx sensor;
adjusting a subsequent measurement provided by the first NOx sensor based on the determined level of error in measurements provided by the first NOx sensor; and
controlling the first DEF injector to inject DEF at a first adjusted rate based on the adjusted measurement provided by the first NOx sensor;
controlling a second DEF injector downstream of the close-coupled selective catalytic reduction system and upstream of the underbody selective catalytic reduction system to increase a second rate at which the second DEF injector injects DEF into the exhaust gas flow;
measuring a third level of NOx gases with the second NOx sensor downstream of the close-coupled selective catalytic reduction system and upstream of the underbody selective catalytic reduction system and a fourth level of NOx gases with a third NOx sensor downstream of the underbody selective catalytic reduction system as the second rate at which the second DEF injector injects DEF increases;
using the measurements of the third and fourth levels of NOx gases to determine a level of error in measurements provided by the second NOx sensor;
adjusting a subsequent measurement provided by the second NOx sensor based on the determined level of error in measurements provided by the second NOx sensor; and
controlling the second DEF injector to inject DEF at a second adjusted rate based on the adjusted measurement provided by the second NOx sensor.

2. The method of claim 1, further comprising controlling NOx tailpipe emissions using the underbody selective catalytic reduction system while controlling the first DEF injector upstream of the close-coupled selective catalytic reduction system to increase the first rate at which the DEF injector injects DEF into the exhaust gas flow.

3. The method of claim 1, further comprising adjusting future measurements provided by the first NOx sensor based on the determined level of error in measurements provided by the first NOx sensor.

4. The method of claim 1 wherein operating the diesel engine includes controlling the diesel engine such that the exhaust gas flow has a constant flow rate, a constant level of NOx gases, and a constant temperature as it enters the exhaust after-treatment system.

5. The method of claim 1, further comprising:
while operating the diesel engine, operating the exhaust after-treatment system to eliminate ammonia present in the close-coupled selective catalytic reduction system;
after operating the exhaust after-treatment system to eliminate ammonia present in the close-coupled selective catalytic reduction system, controlling the diesel engine such that the exhaust gas flow has a variable level of NOx gases as it enters the exhaust after-treatment system;
measuring NOx gases with the first NOx sensor and the second NOx sensor as the level of NOx gases in the exhaust gas flow as it enters the exhaust after-treatment system varies; and
using the measurements taken as the level of NOx gases in the exhaust gas flow as it enters the exhaust after-treatment system varies to determine a level of error in measurements provided by the second NOx sensor.

6. The method of claim 5, further comprising adjusting future measurements provided by the second NOx sensor based on the determined level of error in measurements provided by the second NOx sensor.

7. The method of claim 5 wherein operating the exhaust after-treatment system of the heavy-duty truck to eliminate ammonia present in the close-coupled selective catalytic reduction system includes controlling the first DEF injector to stop injecting DEF into the exhaust after-treatment system upstream of the close-coupled selective catalytic reduction system with respect to the exhaust gas flow.

8. The method of claim 5 wherein controlling the diesel engine such that the exhaust gas flow has a variable level of NOx gases as it enters the exhaust after-treatment system includes adjusting an injection timing of the diesel engine.

9. The method of claim 5 wherein controlling the diesel engine such that the exhaust gas flow has a variable level of NOx gases as it enters the exhaust after-treatment system includes adjusting an exhaust gas recirculation through the diesel engine.

10. The method of claim 5 wherein determining a level of error in measurements provided by the second NOx sensor includes performing a linear regression using the measurements taken by the first and second NOx sensors as the level of NOx gases in the exhaust gas flow as it enters the exhaust after-treatment system varies.

11. The method of claim 1 wherein measuring the first level of NOx gases and the second level of NOx gases and using the measurements to determine the level of error in measurements provided by the first NOx sensor comprises an intrusive diagnostic performed during normal operation of the heavy-duty truck.

12. The method of claim 11, further comprising controlling NOx tailpipe emissions using the underbody selective catalytic reduction system to ensure that tailpipe emissions do not increase to above regulated levels during the performance of the intrusive diagnostic.

13. The method of claim 1, further comprising controlling NOx tailpipe emissions using the close-coupled selective catalytic reduction system while controlling the second DEF injector to increase the second rate at which the second DEF injector injects DEF into the exhaust gas flow.

14. The method of claim 1 wherein measuring the third level of NOx gases and the fourth level of NOx gases and using the measurements of the third and fourth levels of NOx gases to determine the level of error in measurements provided by the second NOx sensor comprises an intrusive diagnostic performed during normal operation of the heavy-duty truck.

15. The method of claim 14, further comprising controlling NOx tailpipe emissions using the close-coupled selective catalytic reduction system to ensure that tailpipe emissions do not increase to above regulated levels during the performance of the intrusive diagnostic.

* * * * *